US012641130B1

(12) United States Patent
Smith

(10) Patent No.: US 12,641,130 B1
(45) Date of Patent: May 26, 2026

(54) SYSTEM AND METHOD FOR MONITORING THE SECURITY CONFIGURATIONS OF CONNECTED DEVICES

(71) Applicant: UIPCO, LLC, San Antonio, TX (US)

(72) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 14 days.

(21) Appl. No.: 18/768,892

(22) Filed: Jul. 10, 2024

Related U.S. Application Data

(62) Division of application No. 18/061,864, filed on Dec. 5, 2022, now Pat. No. 12,069,105, which is a division of application No. 16/925,377, filed on Jul. 10, 2020, now Pat. No. 11,533,342.

(60) Provisional application No. 62/874,040, filed on Jul. 15, 2019.

(51) Int. Cl.
| | |
|---|---|
| *H04L 9/40* | (2022.01) |
| *G06F 21/00* | (2013.01) |
| *G06F 21/45* | (2013.01) |
| *G06F 21/57* | (2013.01) |
| *H04L 41/0813* | (2022.01) |

(52) U.S. Cl.
CPC ............ *H04L 63/205* (2013.01); *G06F 21/45* (2013.01); *G06F 21/577* (2013.01); *H04L 41/0813* (2013.01)

(58) Field of Classification Search
CPC ... H04L 63/205; H04L 63/20; H04L 63/1433; G06F 21/577; G06F 21/50; G06F 21/57; G06F 21/572
See application file for complete search history.

(56) References Cited

U.S. PATENT DOCUMENTS

| | | | |
|---|---|---|---|
| 10,812,521 B1* | 10/2020 | Sharifi Mehr | ...... H04L 63/1433 |
| 2008/0055100 A1* | 3/2008 | Mathur | ............... H04L 41/0869 |
| | | | 340/679 |
| 2016/0321450 A1 | 11/2016 | Liu | |

OTHER PUBLICATIONS

Non-Final Office Action Mailed on Jun. 7, 2022 for U.S. Appl. No. 16/925,377.

* cited by examiner

*Primary Examiner* — Edward Zee
(74) *Attorney, Agent, or Firm* — Plumsea Law Group, LLC

(57) ABSTRACT
A system and method for monitoring and modifying the security configurations of multiple devices is disclosed. The method includes monitoring multiple devices for security triggers and taking action in response to the triggers. The triggers include changes in security configurations, known security issues and pending updates. The devices may be any connected devices, including Internet of Things devices.

20 Claims, 13 Drawing Sheets

BUILD AND MAINTAIN DATABASE OF DEVICES AND SECURITY CONFIGURATIONS ⌐302

PERIODICALLY SCAN FOR NEW DEVICES AND ADD APPROVED DEVICES TO DATABASE ⌐304

MONITOR DEVICES IN DATABASE FOR SECURITY TRIGGERS ⌐306

AUTOMATICALLY TAKE ACTIONS TO KEEP DEVICES SECURED ⌐308

EXPLAIN RISKS AND ACTIONS TO USERS ⌐310

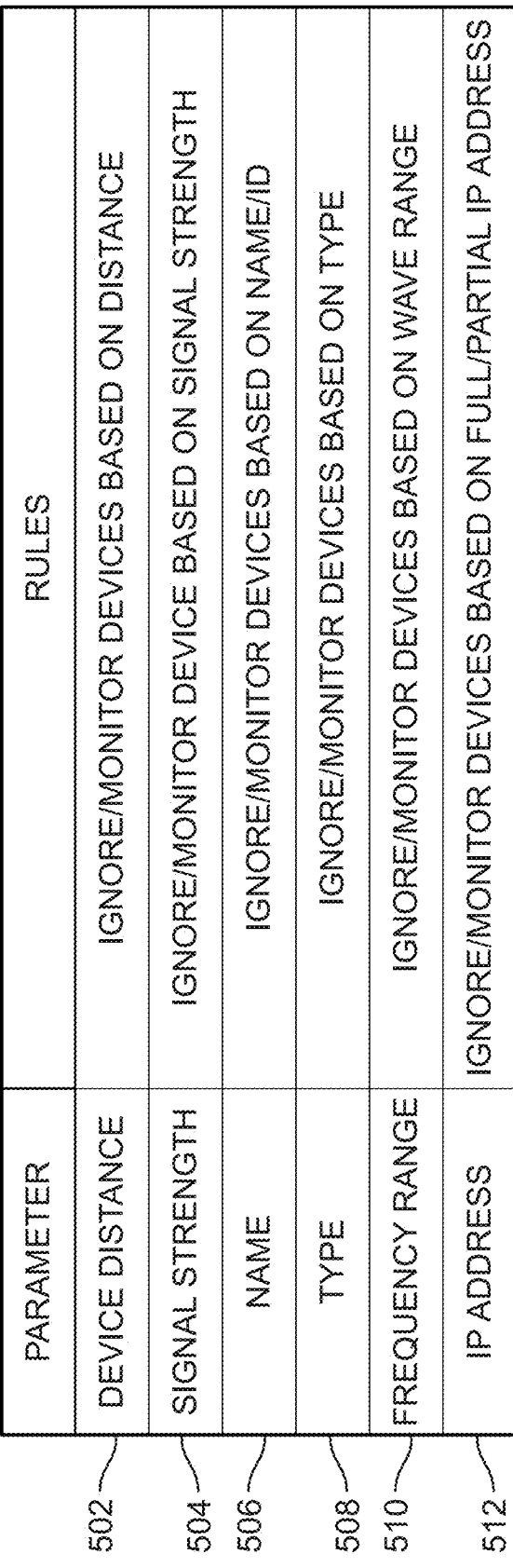

| PARAMETER | RULES |
|---|---|
| 502 DEVICE DISTANCE | IGNORE/MONITOR DEVICES BASED ON DISTANCE |
| 504 SIGNAL STRENGTH | IGNORE/MONITOR DEVICE BASED ON SIGNAL STRENGTH |
| 506 NAME | IGNORE/MONITOR DEVICES BASED ON NAME/ID |
| 508 TYPE | IGNORE/MONITOR DEVICES BASED ON TYPE |
| 510 FREQUENCY RANGE | IGNORE/MONITOR DEVICES BASED ON WAVE RANGE |
| 512 IP ADDRESS | IGNORE/MONITOR DEVICES BASED ON FULL/PARTIAL IP ADDRESS |

FIG. 5

| ACTION | EXAMPLE USE(S) |
|---|---|
| RESTORE SECURITY CONFIGURATION FROM BACKUP | FOR UNEXPECTED CHANGE IN CONFIGURATION FILE OR DEVICE RESET |
| UPDATE SECURITY CONFIGURATION | FOR SCHEDULED UPDATE OR IN RESPONSE TO KNOWN ISSUES |
| CREATE NEW SECURITY CONFIGURATION | IN RESPONSE TO KNOWN ISSUES OR CHANGES IN SECURITY PROFILE/PREFERENCES |
| DISABLE DEVICE | IN RESPONSE TO KNOWN ISSUES |

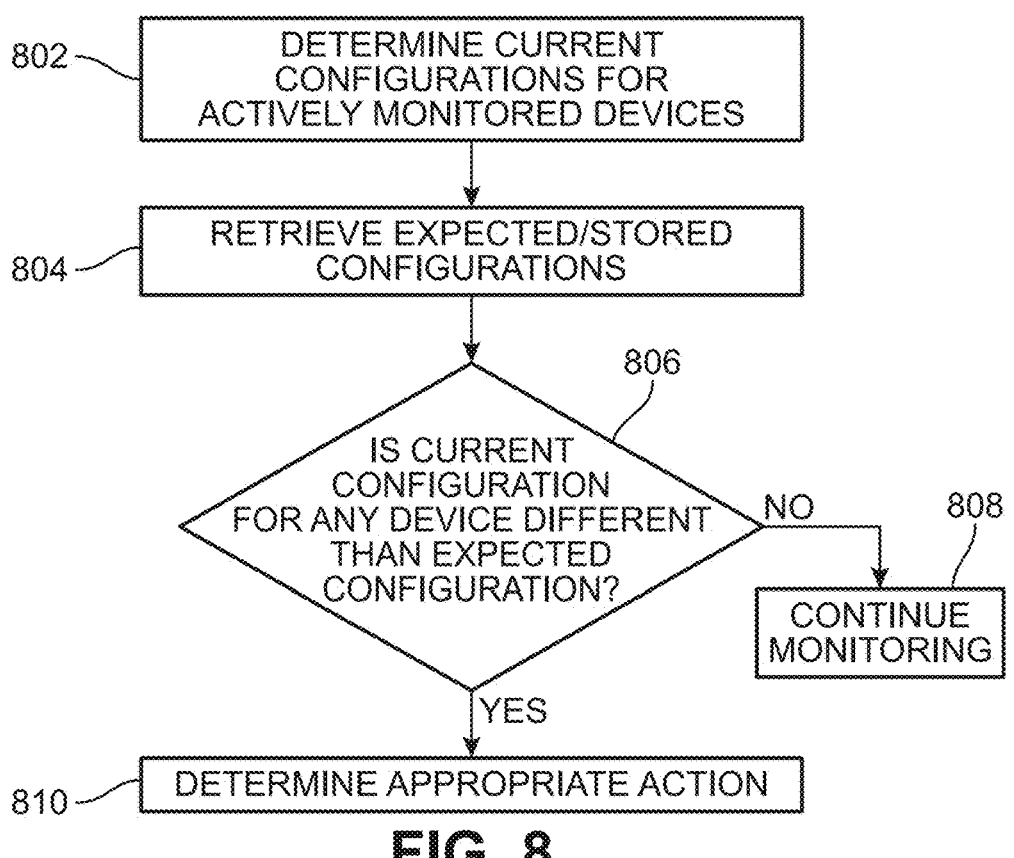

802 — DETERMINE CURRENT CONFIGURATIONS FOR ACTIVELY MONITORED DEVICES

804 — RETRIEVE EXPECTED/STORED CONFIGURATIONS

806 — IS CURRENT CONFIGURATION FOR ANY DEVICE DIFFERENT THAN EXPECTED CONFIGURATION?

NO

808 — CONTINUE MONITORING

YES

810 — DETERMINE APPROPRIATE ACTION

FIG. 8

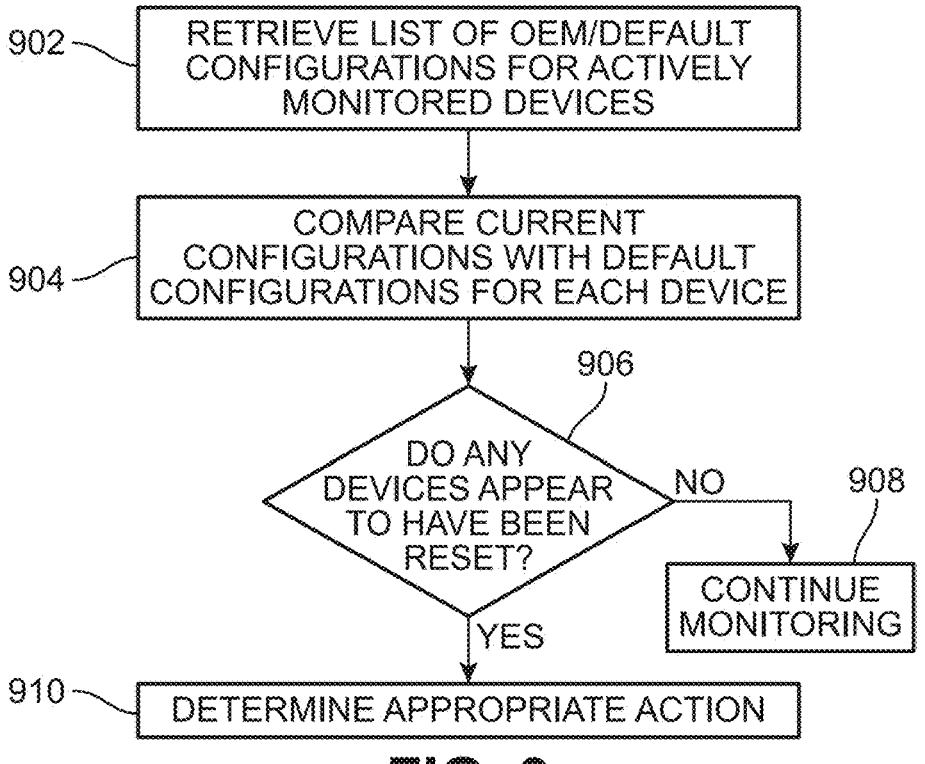

902 — RETRIEVE LIST OF OEM/DEFAULT CONFIGURATIONS FOR ACTIVELY MONITORED DEVICES

904 — COMPARE CURRENT CONFIGURATIONS WITH DEFAULT CONFIGURATIONS FOR EACH DEVICE

906 — DO ANY DEVICES APPEAR TO HAVE BEEN RESET?

NO

908 — CONTINUE MONITORING

YES

910 — DETERMINE APPROPRIATE ACTION

FIG. 9

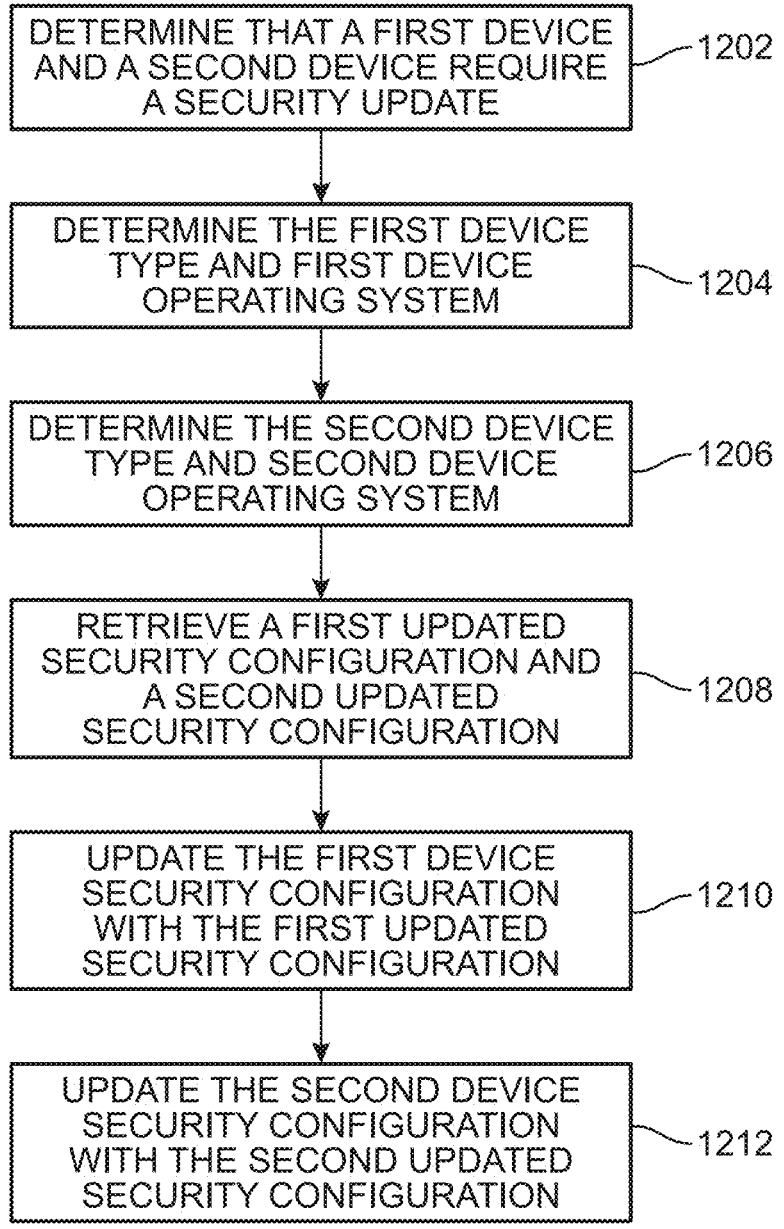

DETERMINE THAT A FIRST DEVICE
AND A SECOND DEVICE REQUIRE
A SECURITY UPDATE ⟋1202

DETERMINE THE FIRST DEVICE
TYPE AND FIRST DEVICE
OPERATING SYSTEM ⟋1204

DETERMINE THE SECOND DEVICE
TYPE AND SECOND DEVICE
OPERATING SYSTEM ⟋1206

RETRIEVE A FIRST UPDATED
SECURITY CONFIGURATION AND
A SECOND UPDATED
SECURITY CONFIGURATION ⟋1208

UPDATE THE FIRST DEVICE
SECURITY CONFIGURATION
WITH THE FIRST UPDATED
SECURITY CONFIGURATION ⟋1210

UPDATE THE SECOND DEVICE
SECURITY CONFIGURATION
WITH THE SECOND UPDATED
SECURITY CONFIGURATION ⟋1212

FIG. 12

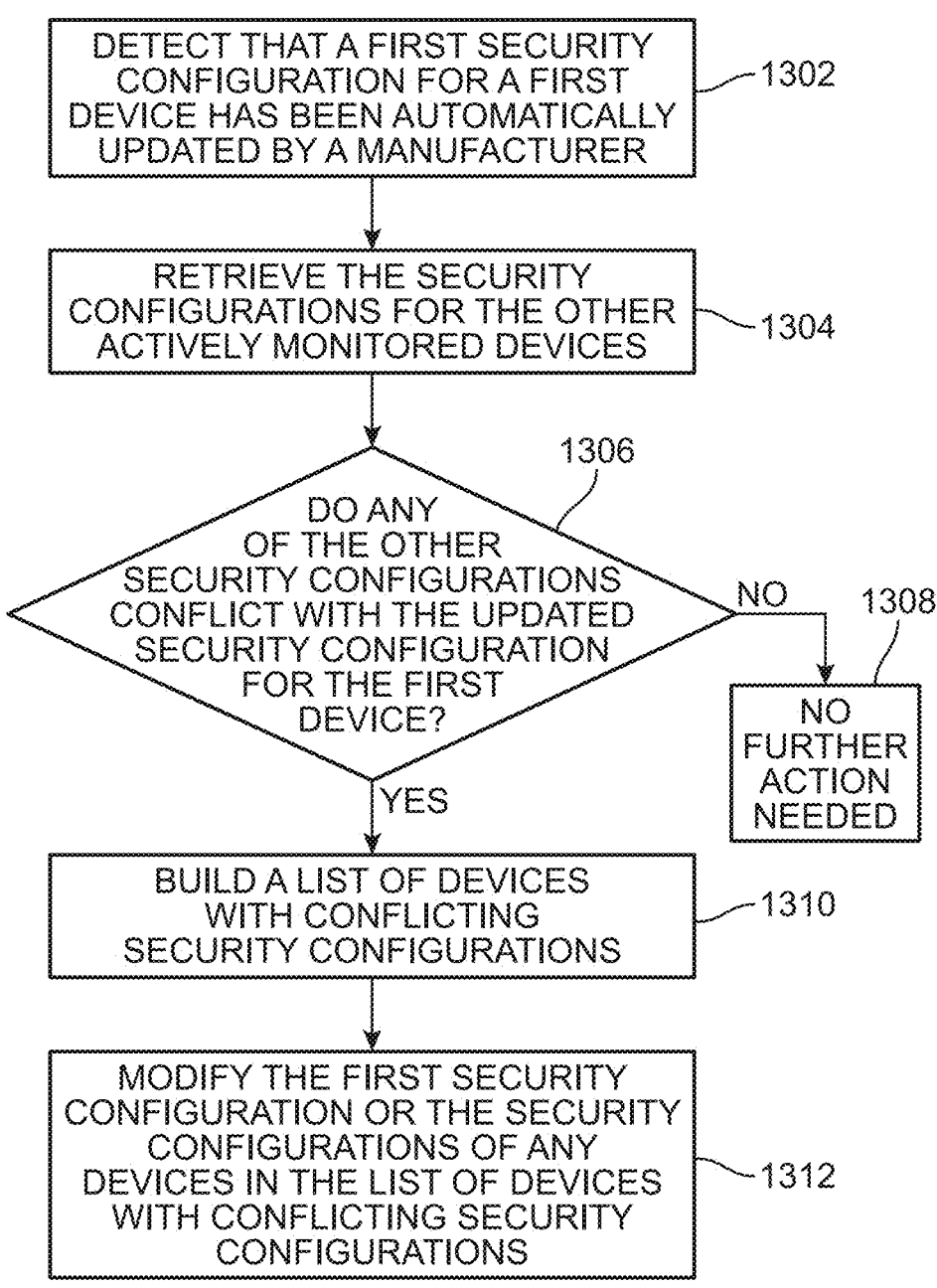

DETECT THAT A FIRST SECURITY CONFIGURATION FOR A FIRST DEVICE HAS BEEN AUTOMATICALLY UPDATED BY A MANUFACTURER — 1302

RETRIEVE THE SECURITY CONFIGURATIONS FOR THE OTHER ACTIVELY MONITORED DEVICES — 1304

DO ANY OF THE OTHER SECURITY CONFIGURATIONS CONFLICT WITH THE UPDATED SECURITY CONFIGURATION FOR THE FIRST DEVICE? — 1306

NO    1308

NO FURTHER ACTION NEEDED

YES

BUILD A LIST OF DEVICES WITH CONFLICTING SECURITY CONFIGURATIONS — 1310

MODIFY THE FIRST SECURITY CONFIGURATION OR THE SECURITY CONFIGURATIONS OF ANY DEVICES IN THE LIST OF DEVICES WITH CONFLICTING SECURITY CONFIGURATIONS — 1312

FIG. 13

SYSTEM AND METHOD FOR MONITORING THE SECURITY CONFIGURATIONS OF CONNECTED DEVICES

CROSS-REFERENCE TO RELATED APPLICATIONS

This application claims the benefit of Provisional Patent Application No. 62/874,040 filed Jul. 15, 2019, and titled "System and Method for Monitoring the Security Configurations of Connected Devices." In addition, this application is a Divisional of co-pending U.S. patent application Ser. No. 18/061,864 filed Dec. 5, 2022 and titled "System and Method for Monitoring the Security Configurations of Connected Devices", which is a Divisional of U.S. patent application Ser. No. 16/925,377 filed Jul. 10, 2020 and titled "System and Method for Monitoring the Security Configurations of Connected Devices". The entire disclosures of these applications are incorporated herein by reference.

TECHNICAL FIELD

The present disclosure generally relates to security, and in particular to a system and method for monitoring connected devices.

BACKGROUND

As the number of different connected devices (such as IoT devices) increases, there is considerable onus placed on the device owners to keep the devices secured. However, most people who own and/or operate these devices are not necessarily aware of the security requirements for each device and/or how to keep the security configurations up to date in light of new known security issues.

There is a need in the art for a system and method that addresses the shortcomings discussed above.

SUMMARY

In one aspect, a method of modifying the security configurations of one or more devices includes retrieving a list of monitored devices, retrieving a current security configuration for a device in the list of monitored devices, retrieving a manufacturing default configuration for the device, determining if the current security configuration is substantially similar to the manufacturing default configuration, and changing the current security configuration when the current security configuration is substantially similar to the manufacturing default configuration.

In another aspect, a method of keeping one or more devices secure, including retrieving a list of monitored devices, determining that a first device and a second device from the list of monitored devices are known to have unresolved security issues, retrieving a first updated configuration for the first device and retrieving a second updated configuration for the second device, and distributing the first updated configuration to the first device and the second updated configuration to the second device.

In another aspect, a method of modifying the security configurations of one or more devices includes detecting that a first security configuration for a first monitored device has been automatically updated, retrieving a second security configuration for a second monitored device, where the second monitored device can communicate with the first monitored device, determining if the first security configuration conflicts with the second security configuration, and modifying the first security configuration or the second security configuration when the first security configuration conflicts with the second security configuration.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a schematic view of a set of fencing parameters, according to an embodiment;

FIG. 7 is a schematic view of a set of actions that can be taken in response to security triggers, according to an embodiment;

FIGS. 8, 9, 10, and 11 are schematic views of sub processes of the process depicted in FIG. 6;

FIG. 12 is a schematic view of a process for selectively updating security configurations according to a device type and device operating system;

FIG. 13 is a schematic view of a process for checking if two security configurations are in conflict, according to an embodiment.

DESCRIPTION OF THE EMBODIMENTS

The embodiments provide a system and method for automatically monitoring multiple connected devices and adjusting the security configurations of the devices to keep the devices secured. As used herein, the term "security configuration" refers to any settings of a device that affect the device's security. A security configuration may comprise one or more security parameters or settings. The security configuration of a device can include passwords, firewall settings, various permissions, authentication methods, encryption methods, as well as other settings. A security configuration could be stored as one or more files, as values in a database, or in any other suitable format.

The system includes a hub device that can monitor other devices in range of the hub device. The hub device tracks the security configurations for each device and adjusts the security configurations as needed according to different security triggers. The triggers include unintended changes to the security configurations, factory resets to the security configurations, outdated configurations, and known security issues. The hub device can restore, update and create new security configurations and/or disable a device. In addition, the hub device can check for potential conflicts between the security configurations of different devices that may communicate directly or over the same network. When applying updates to the security configurations of different devices, the hub device can detect the device type and operating system version to ensure an appropriate security update is applied.

The exemplary system and method helps enhance the security of these devices by ensuring that the security configurations are updated regularly and whenever a device is reset. The system and method also ensure that known security issues are addressed in a timely manner without requiring the user to manually track and apply security changes to devices.

Figure 1:
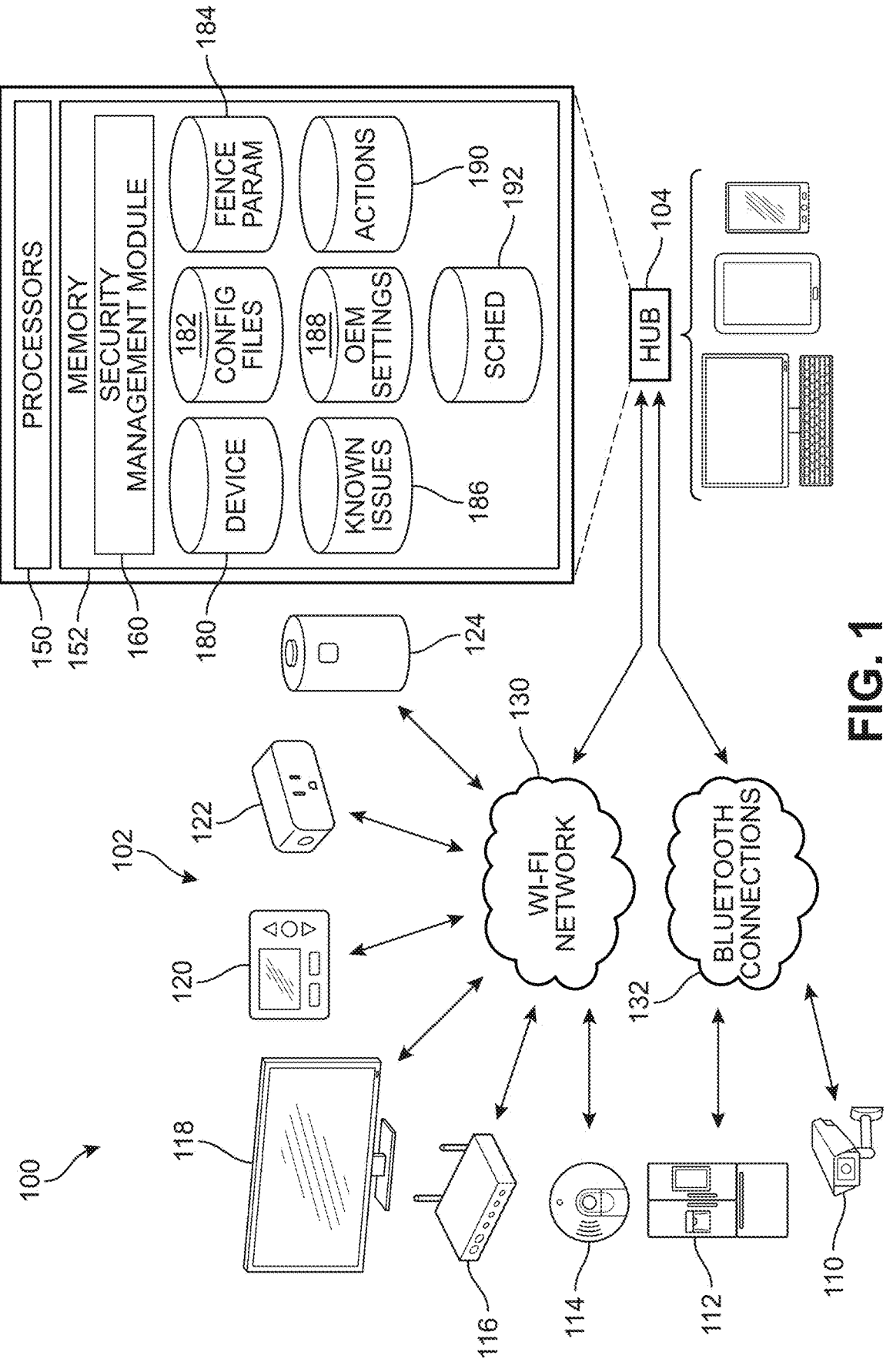
FIG. 1 is a schematic view of a multi-device security management system, according to an embodiment.

FIG. 1 is a schematic view of an embodiment of a multi-device security management system 100, also referred to simply as system 100. System 100 includes a plurality of connected devices, further comprising a plurality of monitored devices 102 and a hub device 104. Monitored devices 102 may comprise a variety of different devices, including various kinds of smart devices and Internet of Things devices. For purposes of illustration, several examples are shown in FIG. 1. These include a security camera 110, a smart fridge 112, a smoke detector 114, a wireless router 116, a smart TV 118, a thermostat 120, a smart plug (or socket) 122, and a smart speaker 124. Still further examples of connected devices that could be monitored are discussed below.

Hub device 104 may also be a connected device. In contrast to monitored devices 102, hub device 104 is configured to monitor the other devices. That is, hub device may be a security managing device. Hub device could comprise any kind of computing device. Exemplary computing devices include, but are not limited to: desktop computers, laptops, tablet devices and mobile phones. In some cases, a hub device may be a general purpose computing device. However, in other cases, a hub device could be any other device with computing resources sufficient to run a security monitoring application. For example, in other cases, the hub device could comprise a router or a smart speaker. Furthermore, it may be appreciated that in some cases general purpose computing devices, such as laptops, desktop computers, mobile phones and tablets could also be monitored devices.

The connected devices may communicate over various kinds of networks and/or direct connections. For example, some devices could communicate with one another and with hub device 104 over Wi-Fi network 130. As another example, some devices could communicate with one another and with hub device 104 over Bluetooth connections 132. Still other devices could communicate over any other local area networks (LANs), personal area networks (PANs), or using near field communications. Some devices could also communicate using LIDAR based transmissions. Moreover, devices can also communicate with remote servers or other backend services using the Internet, which may be accessible over a Wif-Fi network, a cellular network, or Ethernet.

Hub device 104 may be configured with one or more processors 150 and memory 152. Memory 152 may comprise a non-transitory computer readable medium. Instructions stored within memory 152 may be executed by the one or more processors 150.

Hub device 104 may include a security management module 160, also referred to simply as module 160. In some cases, module 160 may comprise a software application that may be stored in memory 152 and run on processors 150. As described in further detail below, module 160 may include provisions for detecting devices, actively monitoring the security configurations of devices, monitoring network traffic between the devices, as well as provisions for changing the security configurations of one or more devices to keep the devices secured.

To facilitate the operation of security management module 160, hub device 104 may include (or otherwise have access to) one or more databases. These include a device database 180, a configuration files database 182, a fencing parameters database 184, a known issues database 186, an OEM settings database 188, an actions database 190, and a schedule database 192. In some cases, hub device 104 could further include one or more databases that track usage and historical activity for each device.

Device database 180 may include records for each device that is, or historically has been, monitored. In some cases, each record may include a device identifier, an IP address associated with the device, the type of signal used by the device for communication (for example, a radio signal in the Wi-Fi transmission range, a radio signal in the Bluetooth transmission range, a radio signal in the 5G range, etc.), a list of functions that can be used with the device (for example, a function to change passwords on the device, etc.), known exploits, the date the device was first detected, a frequency at which the security configurations for the device should be updated, and the set of parameters in the security configuration that can be/should be changed. Device database 180 may also include information that can be used to control features of a connected device. For example, device database 180 could store a function to change passwords on a given device. Device database 180 could also store functions to enable and/or disable features like video, audio, etc.

Configuration files database 182 may comprise one or more configuration files for each monitored device that is listed in device database 180. In some cases, configuration files database 182 may include not only current configuration files, but also historical configuration files that may be used for backup. Fencing parameters database 184 may include various parameters that are used to determine which devices to monitor (of all devices in range of the hub device). Alternatively, in some cases, usage history information could be used to determine which devices to monitor. Known issues database 186 includes information about known security issues (current and/or historic) for each device listed in device database 180. Original equipment manufacturer (OEM) settings database 188 includes information about OEM or factory default settings for each monitored device in device database 180. Actions database 190 includes information about actions that can be taken in response to detected security issues. Schedule database 192 includes information indicating when, or how frequently, each device's security configurations should be updated. For example, schedule database 192 may include information indicating that the password on a smart thermostat should be reset every six months, or if activity volume, timing or type changes significantly.

Figure 2:
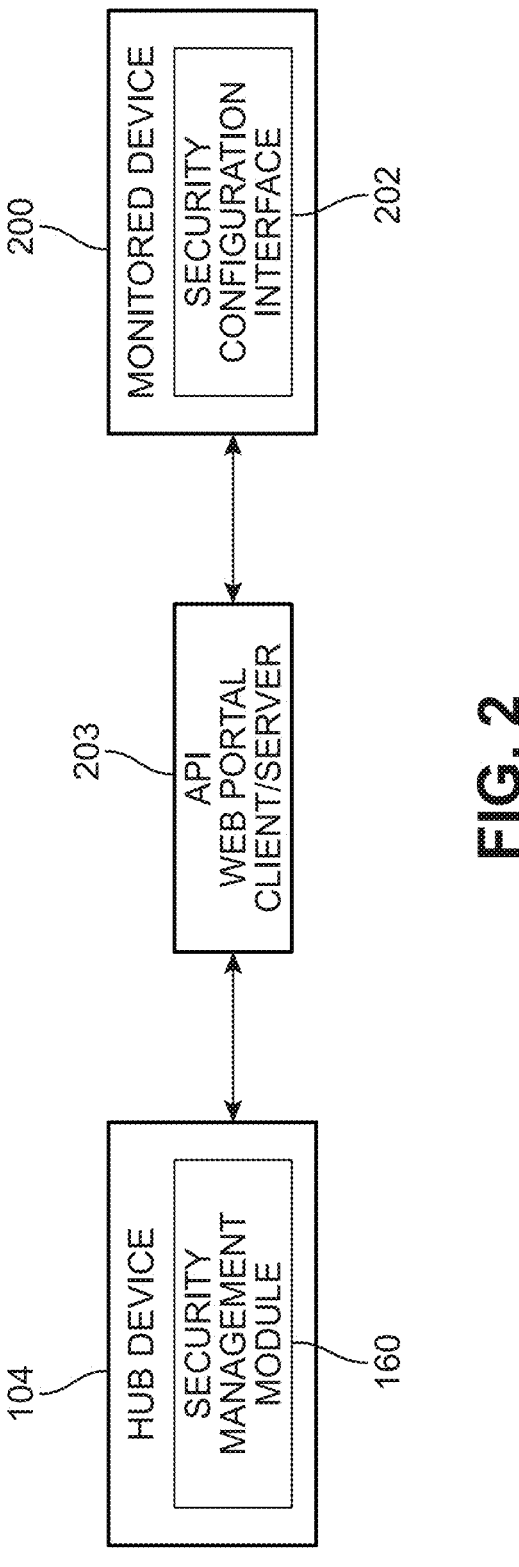
FIG. 2 is a schematic view of possible communication methods between a hub device and a monitored device, according to an embodiment.

FIG. 2 is a schematic view indicating possible communication methods between hub device 104 and an exemplary monitored device 200. As previously described, hub device 104 includes a security management module 160. Each monitored device may also include a security configuration interface 202. Security configuration interface 202 includes any provisions that allow the security configuration of the device to be changed. In some cases, security configuration interface 202 may also facilitate additional functionality, such as disabling a device and/or preventing a device from communicating over one or more networks.

In different embodiments, different methods 203 could be used to access this interface. In some embodiments, monitored device 200 can include an application programming interface (API) that can be directly accessed by module 160 to change the security configuration and/or disable device 200. In other embodiments, monitored device 200 can include a web or browser portal that is accessible over the Internet or by connecting directly to the device's IP address. In other embodiments, hub device 104 and monitored device 200 could be placed in a server/client relationship. Specifically, a server application may be configured to run on hub device 104 and a client application may be configured to run on monitored device 200. To change the security configurations of device 200 (or perform other functionality), module 160 may send commands via the server. These commands are received by the client, which can take the necessary actions on monitored device.

Figure 3:
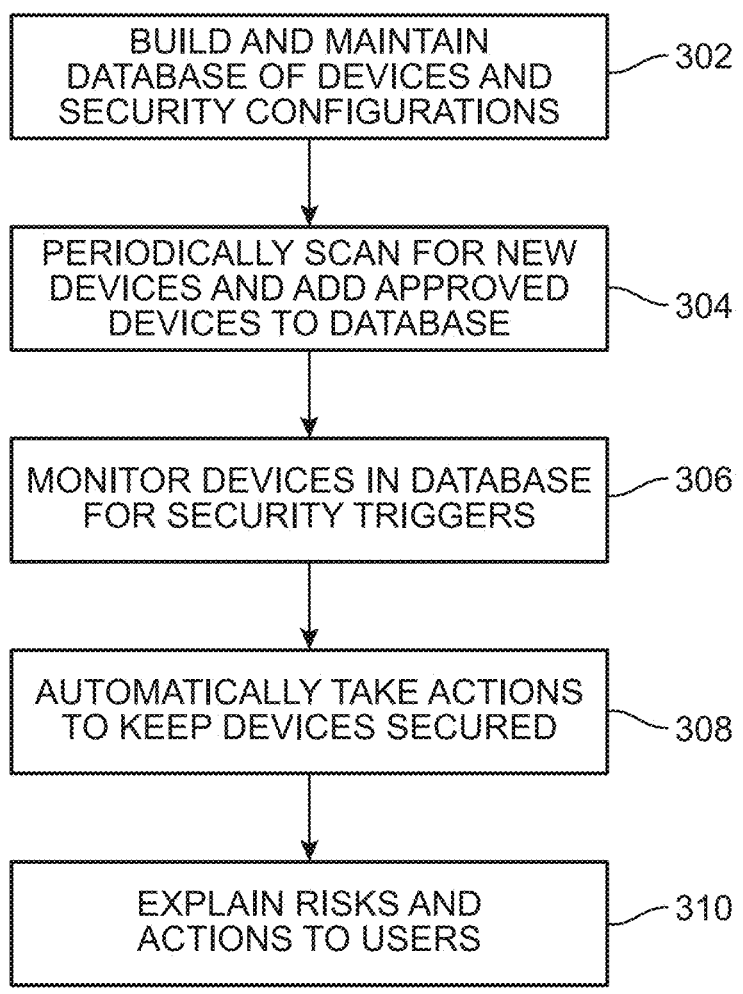
FIG. 3 is a schematic view of a process for monitoring devices and taking actions to keep the devices secured.

FIG. 3 is a schematic view of an exemplary process for keeping a set of actively monitored devices secured using a hub device with a security management module (such as module 160). First, in step 302, module 160 may build and maintain a database of devices and associated security configurations. As part of this step, module 160 may also retrieve any information required to populate the records in the various databases of FIG. 1. For example, during this step, module 160 could retrieve all known issues for the devices in the device database. Likewise, module 160 could retrieve the OEM settings for each device as well as scheduling parameters. In some cases, before building this database, module 160 could prompt a user to input one or more fencing parameters that are used to determine which devices to add or ignore to the list of monitored devices.

Next, in step 304, module 160 may periodically scan for new devices and add approved devices to the device database. As new devices are added, the associated information stored in other databases could also be added. This process of periodically scanning for new devices could occur at regular intervals so that the system is constantly including devices that a user may have recently purchased/acquired. Alternatively, scanning for new devices could be done "on demand" or in response to changes in other parameters.

In step 306, module 160 monitors the devices that are in the database (and which are currently on/active) for security triggers. As used herein, the term "security trigger" refers to an event or change that requires the system to assess whether action is necessary to keep the device secured. In step 308, module 160 may automatically take actions to keep the devices secured in response to detecting one or more security triggers.

Finally, in step 310, module 160 may initiate a process of explaining the risks and actions taken to end users of the devices. For example, module 160 could send a user notifications (to an email or SMS account) providing information about the actions taken and the level of risk associated with not taking the action. This information allows users to understand why specific changes may be made to their devices' security configurations.

Figure 4:
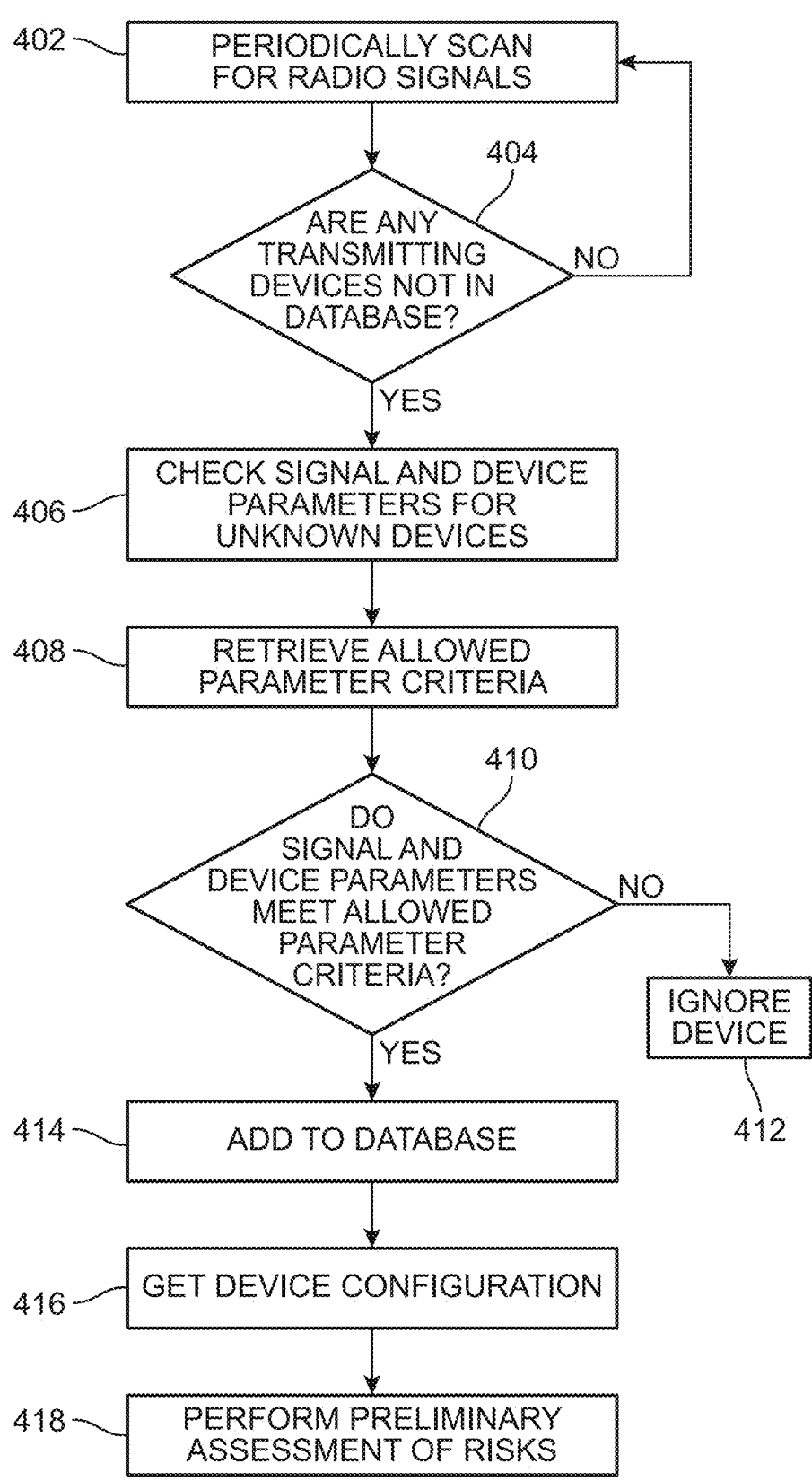
FIG. 4 is a schematic view of a process for periodically adding new devices to the list of monitored devices.

FIG. 4 is a schematic view of possible steps used to accomplish step 304 of FIG. 3. In a first step 402, module 160 may periodically scan its environment for various kinds of radio signals to determine devices that are transmitting. Although the embodiments use radio signals, these principles could also be applied to devices communicating over other electromagnetic frequencies, such as LIDAR based communication.

In step 404, module 160 determines if any of the transmitting devices are not already in device database 180. If there are no new devices detected, module 160 may return to step 402. Otherwise, module 160 proceeds to step 406. In step 406, module 160 may check the signal and device parameters for the unknown devices (that is, devices not already in the database). That is, module 160 determines various characteristics of the signal and device based on the received transmissions, or by sending a request(s) to the devices.

Next, in step 408, module 160 may retrieve a set of allowed parameter criteria. The allowed parameter criteria correspond to criteria that may be used to determine if a given device is one that should be monitored. In some cases, the allowed parameter criteria can be retrieved from a database (for example, fencing parameter database 184). Examples of these criteria are discussed below and shown in FIG. 5.

In step 410, module 160 may check to see if the unknown device parameters meet the allowed parameter criteria. If not, module 160 proceeds to step 412 and ignores the device. Otherwise, module 160 proceeds to step 414 to add the unknown device to the list of monitored devices. In step 416, module 160 retrieves the device's security configuration and stores the configuration (for example, in configuration files database 182). Finally, module 160 performs a preliminary assessment of risks for the device in step 418.

FIG. 5 is a schematic view of a set of fencing parameters (or criteria) that may be used to determine if a device should be monitored or ignored. The fencing parameters could be stored in a table or in any other format. In this example, a set of exemplary parameters are given, along with a summary of the rules that may govern the use of the parameters. These include a device distance 502, a signal strength 504, a device name 506, a device type 508, a frequency range 510, and an IP address 512.

The values of these parameters can vary according to the situation. For example, in a home, a user may know that most devices he or she is interested in monitoring will be within a maximum distance of the hub device. By contrast, in a public space shared by many different users, using a maximum distance may not be especially useful. Instead, an operator of a monitoring system could utilize a particular naming convention for devices that want to be included in monitoring.

Figure 6:
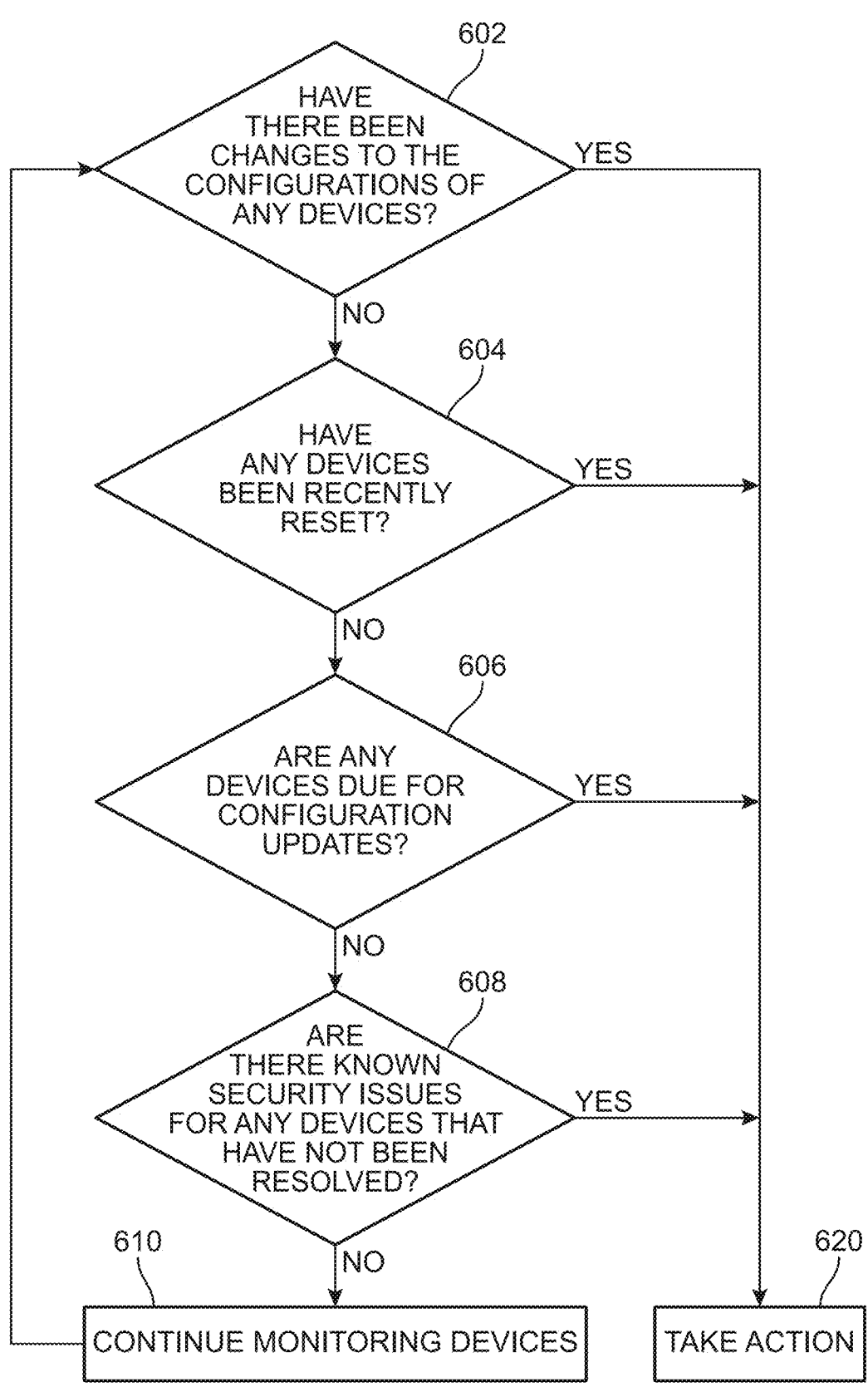
FIG. 6 is a schematic view of a process for checking for security triggers that may require action, according to an embodiment.

FIG. 6 is a schematic view of a general process for checking for various kinds of security triggers. Exemplary security triggers can include, but are not limited to: detected changes of security configurations, resets of security configurations, scheduled changes to security configurations, and known security issues. The process of FIG. 6 depicts a process whereby a security management module (for example, module 160) may check for actions to perform based on a variety of triggers. Starting in step 602, module 160 may determine if there have been any changes to the security configurations of any devices. These changes could be user initiated and/or initiated by a third party. For example, changes could have been initiated by a vendor or manufacturer of the device. In some cases, changes could have been made unintentionally by a user of the device. If there have been changes made to the security configurations, module 160 may proceed to step 620 to take further action. Otherwise, module 160 proceeds to step 604.

In step 604 module 160 checks to see if any devices have recently been reset to their default configurations. Such resets could occur when a device loses power or experiences power spikes, for example. If any devices have been recently reset, module 160 may proceed to step 620 to take further action. Otherwise module 160 proceeds to step 606.

In step 606, module 160 may check to see if any devices are due for security configuration updates. As an example, a device may be due for a password change. If so, module 160 may proceed to step 620 to take further action. Otherwise, module 160 proceeds to step 608.

In step 608, module 160 checks to see if there are any known security issues that have not been resolved for any of the devices. If so, module 160 may proceed to step 620 to take further action. Otherwise, module 160 proceeds to step 610 to continue monitoring the devices. At this point, module 160 could return to step 602 to continue checking for security triggers.

FIG. 7 is a schematic view of a set of actions that a security management module may take in response to one or more triggers. It may be appreciated that these actions are only exemplary and in other embodiments a module could take other suitable actions. Referring to FIG. 7, a first action 702 may comprise restoring the security configuration from a backup. This action could be taken if there is an unexpected change in the security configuration on the device or if there is a device reset. A second action 704 may comprise updating the security configuration of a device. This action could be taken if there is a scheduled/pending update. This action could also be taken in response to a known issue. A third action 706 may comprise creating a new security configuration. This action could be taken in response to known or unknown issues or based on changes in a user's security preferences. A fourth action 708 may comprise disabling a device. This action could be taken in response to known issues when there is currently no updated configuration to fix the issues. As discussed in further detail below, a device could also be disabled in response to a detected security attack.

FIGS. 8-11 are detailed processes associated with some of the steps from the process of FIG. 6. Specifically, FIG. 8 is a detailed process for checking to see if a security configuration has been changed. Starting at step 802, module 160 may determine the current configurations for any actively monitored devices. Next, in step 804, module 160 may retrieve the expected/stored configurations for these devices. In step 806, module 160 may check to see if the current configuration for any device is different than the expected/stored configuration. If not, module 160 may proceed to step 808 to continue monitoring devices. Otherwise, module 160 proceeds to step 810 to determine an appropriate action to take in response to the detected change in the security configuration.

FIG. 9 is a detailed process for checking to see if a security configuration has been reset. Starting at step 902, module 160 may retrieve a list of OEM/default configurations for the actively monitored devices. Next, in step 904, module 160 may compare the current configurations with the default configurations. In step 906, module 160 may determines if any devices have been reset based on the comparisons in step 904. Specifically, if the current configuration of a device matches the OEM/default configuration, then it may be assumed the device has been reset. If the device has not been reset, module 160 proceeds to step 908 to continue monitoring devices. Otherwise, module 160 proceeds to step 910 to determine an appropriate action to take in response to the detected device reset.

Figure 10:
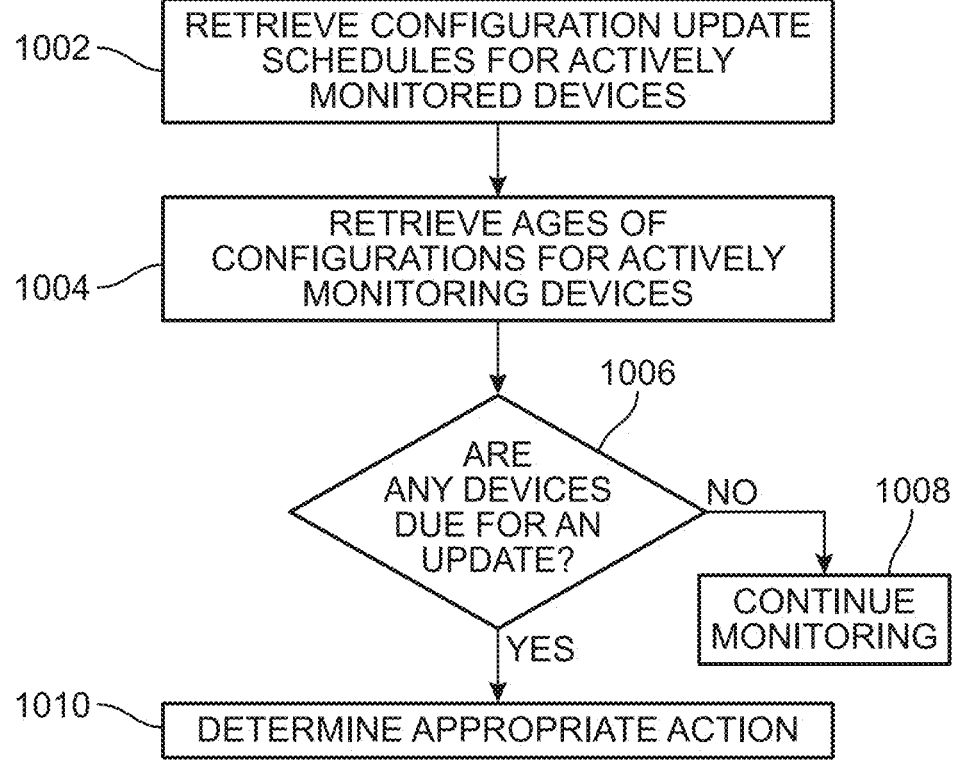

FIG. 10 is a detailed process for checking to see if a security configuration is due for an update. Starting at step 1002, module 160 may retrieve the configuration update schedules for the actively monitored devices. Next, in step 1004, module 160 may retrieve (or otherwise determine) the age of the current configurations (that is, the date they were last updated) for the actively monitored devices. In step 1006, module 160 checks to see if any devices are due for an update based on the retrieved update schedules. If not, module 160 proceeds to step 1008 to continue monitoring devices. Otherwise, module 160 proceeds to step 1010 to determine an appropriate action to take in response to pending update. It may be appreciated that scheduled changes could be associated with particular security settings and not necessarily to the entire security configuration. For example, a module could update the password of a device every few months while leaving other security settings unchanged.

Figure 11:
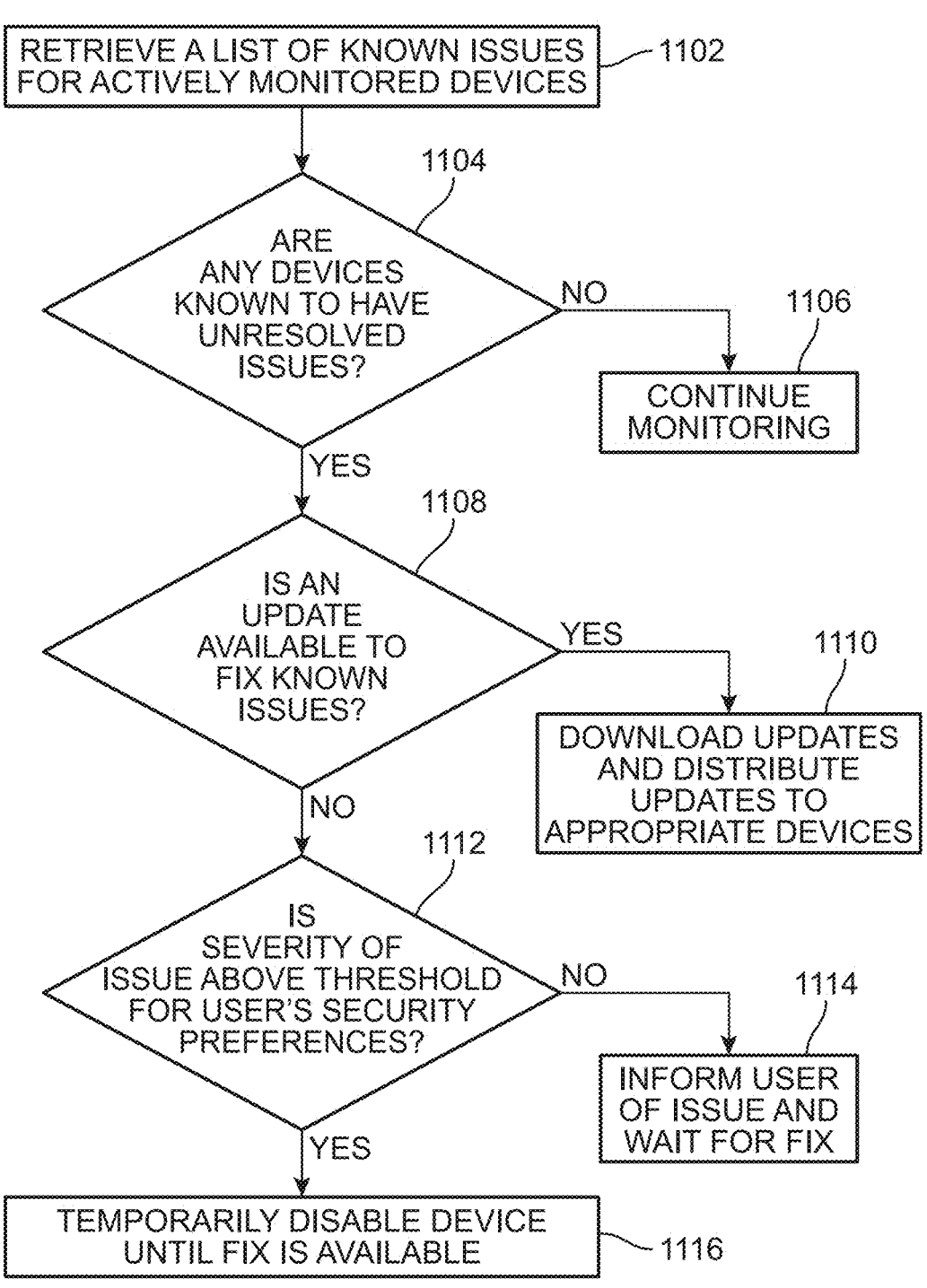

FIG. 11 is a detailed view of a process for checking to see if there are any known security issues for any actively monitored devices. Starting in step 1102, module 160 may retrieve a list of known issues for the actively monitored devices. Next, in step 1104, module 160 may check to see if any of the devices have unresolved security issues. If not, module 160 proceeds to step 1106 to continue monitoring devices. Otherwise, module 160 proceeds to step 1108. In step 1108, module 160 checks to see if there are updates available to fix the known issues. If there are updates available, module 160 may proceed to step 1110. In step 1110, module 160 may download the updates and distribute the updates to the appropriate devices.

If no updates are found in step 1108, module 160 proceeds to step 1112. In step 1112, module 160 determines if the severity of the security issues is above a threshold for a user's security preferences. That is, module 160 determines if this particular threat is something that would concern a user based on their known security preferences. If it is not, module 160 proceeds to step 1114 to inform the user of the issue and wait for a fix. If, however, the issue is believed to be substantial enough to be concerning to a user, module 160 may proceed to step 1116. In step 1116, module 160 may temporarily disable the device or certain functions until a fix is available.

FIG. 12 is an exemplary process that may occur as part of distributing security updates to different devices for a given known issue (step 1110). In this example, two monitored devices may both be exposed to the same known security issue which requires a security update to both devices, as determined in step 1202. However, the devices are determined to be different and run different operating systems, as in step 1204 and step 1206. Therefore, the devices may require different security configurations to fix the issue. In step 1208, module 160 retrieves updated security configurations for each device. In step 1210, module 160 updates the security configuration of the first device with a first updated security configuration. In step 1212, module 160 updates the security configuration of the second device with a second updated security configuration.

The method of FIG. 12 allows the present system to automatically update the security configurations for devices that may be running different operating systems. For example, a first device could be a laptop running a desktop operating system while a second device could be a mobile device running a mobile operating system.

FIG. 13 is a schematic process for managing conflicting security configurations. Such conflicts may arise, for example, when security configurations for a device are automatically updated by the device manufacturer or some other party. Starting in step 1302, module 160 detects that a first security configuration for a first device has been automatically updated by a manufacturer. Next, in step 1304, module 160 retrieves the security configurations for the other actively monitored devices. In step 1306, module 160 checks whether any of the retrieved security configurations conflict with the updated security configuration for the first device. If not, module 160 takes no further action in step 1308. If so, module 160 builds a list of devices with conflicting security configurations in step 1310. Then, in step 1312, module 160 may modify either the first security configuration or the security configuration of any devices in the list in order to remove the conflict, or disable one or more functions.

Figure 14:
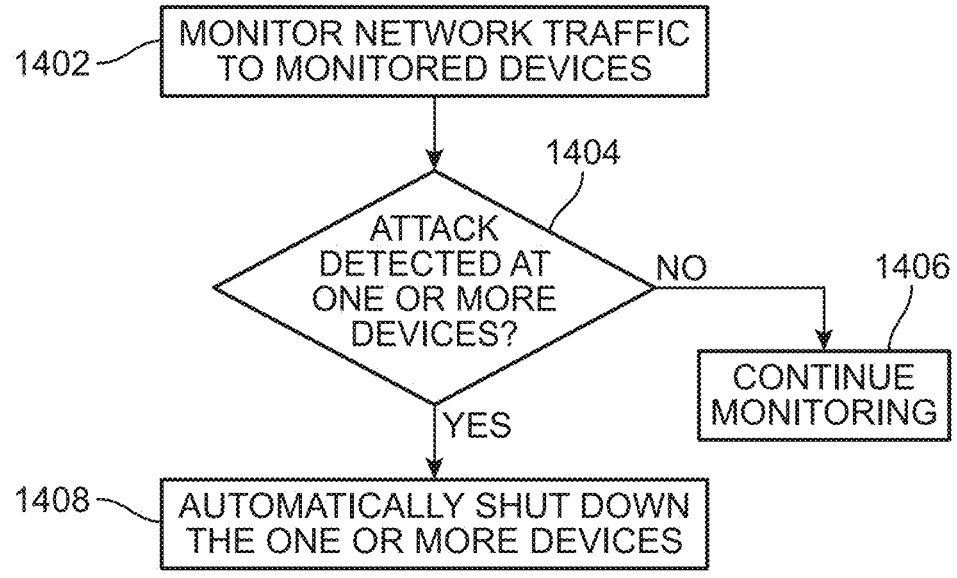
FIG. 14 is a schematic view of a process for shutting down a device in response to an attack.

FIG. 14 is a schematic view of a process for shutting down a device in response to a security attack. In step 1402, module 160 monitors network traffic to the actively monitored devices. In step 1404, module 160 determines if there is an attack directed to any of the devices. If not, module 160 proceeds to step 1406 to continue monitoring the devices. If an attack is detected, module 160 may automatically shut down the one or more devices until further actions can be taken.

The embodiments may be used with a variety of different devices, including so-called "smart" devices, "connected" devices, and Internet of Things (IoT) devices. Such devices may include, but are not limited to: various kinds of kitchen appliances, smart TVs, wireless speakers, lights and controllers, sprinkler systems and controllers, water systems and controllers, power and controllers, air conditioning and controllers, security system components and controllers (for example, window and door locks, security cameras, motion detectors and garage doors/gates), phones, smart radios, smart safes, various computing devices, routers, toys and controllers, drones and controllers, clocks, smoke detectors, as well as a variety of other devices. Still further smart or connected devices that could be used with the disclosed system include, but are not limited to: transportation based devices or systems (for example, cars, bikes, boats, and drones); outdoor devices (such as lawn sensors, watering systems, mail boxes, meters, and pool components); indoor devices (such as power monitors, lights, motion detectors, chemical detectors, and filters); devices associated with buildings (such as vents, doors, locks, windows, heaters, fans, and plumbing systems); medical devices (such as medical labels, drug labels, pace makers, drug dispensers, and health monitors); devices for resting/sleeping (such as mattresses, pillows, and alarms); toy devices (such as dolls/figures, board games, and balls); smart furniture (such as smart chairs, smart tables, and smart safes); smart clothing (such as jackets, shoes, and hats); smart food packaging and utensils; smart IDs; smart appliances (such as washers, dryers, and ovens); smart grooming devices (such as razors and hairdryers); and smart devices for pets (such as collars and leashes).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method of modifying security configurations of one or more devices, comprising:

building a database comprising a list of monitored devices and associated security configurations of the monitored devices based on fencing parameters;

detecting that a first security configuration for a first monitored device in the list of monitored devices has been automatically updated;

retrieving a second security configuration for a second monitored device in the list of monitored devices, wherein the second monitored device can communicate with the first monitored device;

determining if there is a conflict between the first security configuration and the second security configuration; and modifying the first security configuration or the second security configuration when there is a conflict between the first security configuration and the second security configuration.

2. The method of claim 1, wherein modifying the first security configuration or the second security configuration comprises modifying the first security configuration or the second security configuration to remove the conflict.

3. The method of claim 1, wherein modifying the first security configuration or the second security configuration comprises modifying the first security configuration or the second security configuration to disable one or more functions.

4. The method of claim 1, wherein the method includes restoring a previous security configuration for the first monitored device.

5. The method of claim 1, wherein modifying the first security configuration or the second security configuration comprises updating the second security configuration to a new configuration that is not in conflict with the first security configuration.

6. The method of claim 1, wherein the first device and the second monitored device are on different networks.

7. The method of claim 1, wherein detecting that the first security configuration has been automatically updated further comprises detecting that the first security configuration has been updated by a manufacturer of the first monitored device.

8. The method of claim 1, wherein the first monitored device and the second monitored device are substantially different.

9. The method of claim 1, wherein the first monitored device runs a first operating system, the second monitored device runs a second operating system, and the first operating system and the second operating system are substantially different.

10. A method of modifying security configurations of one or more devices, comprising:

building a database comprising a list of monitored devices and associated security configurations of the monitored devices based on fencing parameters;

detecting that a first security configuration for a first monitored device from the list of monitored devices has been automatically updated;

retrieving security configurations for other monitored devices from the list or monitored devices, wherein the other monitored devices can communicate with the first monitored device;

determining whether the first security configuration conflicts with any of the retrieved security configurations; and modifying the first security configuration or the retrieved security configurations for the other monitored devices having conflicting security configurations.

11. The method of claim 10, wherein modifying the first security configuration or the retrieved security configurations for the other monitored devices comprises modifying the first security configuration or the retrieved security configurations for the other monitored devices to remove the conflicting security configurations.

12. The method of claim 10, wherein modifying the first security configuration or the retrieved security configurations for the other monitored devices comprises modifying the first security configuration or the retrieved security configurations for the other monitored devices to disable one or more functions.

13. The method of claim 10, wherein the method further comprises building a list of the other monitored devices with conflicting security configurations.

14. The method of claim 10, wherein the method includes restoring a previous security configuration for the first monitored device.

15. The method of claim 10, wherein modifying the first security configuration or the retrieved security configurations comprises updating the retrieved security configurations to new configurations that are not in conflict with the first security configuration.

16. The method of claim 10, wherein the first monitored device and the other monitored devices are on different networks.

17. The method of claim 10, wherein detecting that the first security configuration has been automatically updated further comprises detecting that the first security configuration has been updated by a manufacturer of the first monitored device.

18. The method of claim 10, wherein the first monitored device and the other monitored devices are substantially different.

19. A system for modifying security configurations of one or more devices, the system comprising:

a plurality of devices; and a hub device connected to each one of the devices, the hub device comprising:

a security management module comprising a security monitoring application running on a computing device, the security management module building a database comprising a plurality of monitored devices and associated security configurations of the plurality of monitored devices from the plurality of devices based on fencing parameters, each monitored device of the plurality of monitored devices comprising a security configuration interface to allow a security configuration of each monitored device to be changed, and the security management module in communication with the security configuration interface of each monitored device; and a security configuration files database in communication with the security management module;

wherein the security management module detects that a first security configuration for a first monitored device in the plurality of monitored devices has been automatically updated, retrieves a second security configuration for a second monitored device in the plurality of monitored devices, wherein the second monitored device can communicate with the first monitored device, determines if there is a conflict between the first security configuration and the second security configuration, and modifies the first security configuration or the second security configuration when there is a conflict between the first security configuration and the second security configuration.

20. The system of claim 19, wherein to modifying the first security configuration or the second security configuration the security management module modifies the first security configuration or the second security configuration to remove the conflict or to disable one or more functions.

* * * * *